United States Patent Office 3,006,720
Patented Oct. 31, 1961

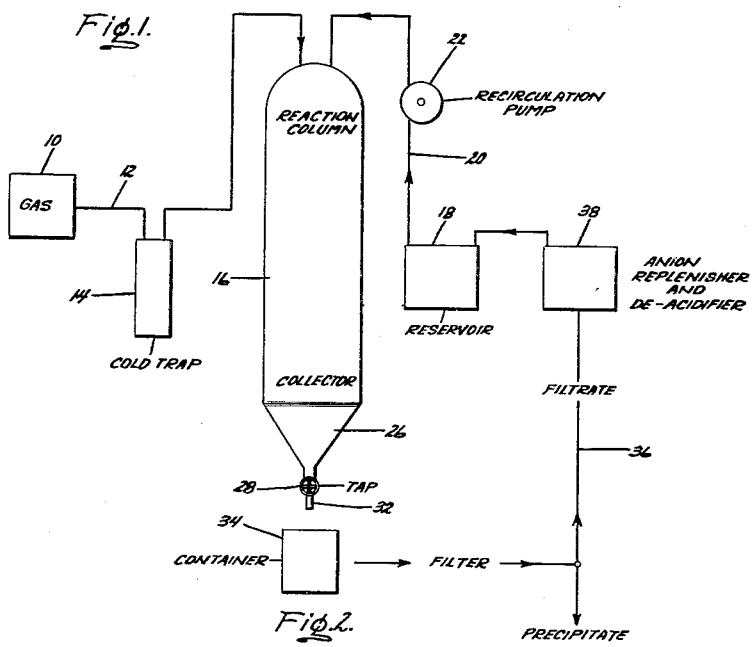

3,006,720
PROCESS FOR PRODUCING HIGH PURITY
SELENIDES OR SULFIDES
Robert C. L'Heureux, Santa Barbara, Calif., assignor to
International Telephone and Telegraph Corporation
Filed Aug. 1, 1958, Ser. No. 752,562
2 Claims. (Cl. 23—50)

This invention relates to a process for preparing high purity selenides or sulfides which are suitable for phosphor or semiconductor use. This necessitates a high degree of purity which attains a luminescence capacity, and this exacting requirement has created a formidable obstacle to its manufacture.

The process proposed by this invention has for its main object the obtainment of a process which can yield a selenide or sulfide product of a high degree of purity suitable for phosphor use, and which is producible in large quantities and continuously if desired.

The foregoing object is achieved by furnishing the anion in a gaseous phase. Thus, in the case of manufacture of the selenide phase, the starting material includes hydrogen selenide, and in the case of sulfide the starting material is hydrogen sulfide. Both these gaseous materials are obtainable in highly purified state for the reason that the materials are more easily refined than the uncombined forms of sulfur and selenium.

The process is continuous and utilizes all of the starting materials by virtue of recycling the reactants and returning them for reaction.

Previous methods of producing sulfides and selenides are unsatisfactory because if the product is synthesized directly from the sulfur and/or selenium, the problem of purification is so great that the final product if sufficiently pure is prohibitively expensive.

Other proposals of manufacture, such as bubbling hydrogen selenide and/or hydrogen sulfide through appropriate metal salt bath are unsatisfactory for the reason that the rate of reaction is extremely slow, the yield is quite low, and the task of recovery and separation of product is unwieldy.

The present invention circumvents these described difficulties by reacting the selenide and/or sulfide in its gaseous form with a fine vapor stage aqueous solution of cation salt and continuously circulating the unreacted ingredients and separating and removing the reaction product.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic diagram illustrating a suitable arrangement for carrying out the inventive process; and FIG. 2 is a detailed view of the reaction chamber in which the reactants are combined to form the selenide or sulfide.

The reactions which are involved in the hereafter described process are written as follows:

(1)        $H_2Se + CdCl_2 \rightarrow CdSe\downarrow + 2HCl$
(2)        $H_2S + CdCl_2 \rightarrow CdS\downarrow + 2HCl$ or a combination of the two cadmium salts could be made by mixing the desired proportions of gases, hydrogen selenide and hydrogen sulfide.

A further advantage to the process is as follows. Since the activator and/or the co-activator elements normally employed to induce the desired properties (photoconductive or otherwise) in the host materials (which are the object of this invention) are also cationic in nature; they may be included directly into the system during the manufacture of the selenides or/and sulfide. This expedient eliminates an extra operation in the production of phosphors or photoconductors, namely, that in which the "impurities" are added to the raw host material. In this way, the yield from this processs may be sensitized directly by the usual procedure. The activator and/or co-activator is added to the solution in the form of soluble salts, such as copper chloride, indium chloride, etc.

The hydrogen sulfide, or hydrogen selenide, is metered from storage tank 10 through inlet lines 12 to a cold trap 14 where it is purified and thence to a reaction chamber 16. The incoming gas (FIG. 1) is passed into the chamber 16 at the upper part of the chamber.

The cadmium chloride, which is in aqueous solution, is contained in a storage or reservoir 18 and the supply line 20 connects reservoir 18 with the top of the chamber 16. A circulation pump 22 forces flow of fluid through line 20. As the cadmium chloride enters the top of the chamber 16, it passes through a spray nozzle 24 (FIG. 2) which breaks up the incoming stream of salt solution into a finely divided mist of droplets which exposes a larger surface area for reaction with the incoming sulfide or selenide gas. The gas and spray are intimately mixed and the reaction between the salt and weak acid gas is in accordance with the foregoing reactions 1 and 2.

The reaction product, an insoluble precipitate which passes along with unreacted salt spray, settles to the conical bottom 26 of the chamber 16 which serves as a collector.

A tap 28 at the base of the chamber 16 controls an outlet which opens to outlet line 32 conducting the material from the conical bottom 26 into a receiving container 34. The product is then filtered to remove the reaction product (cadmium sulfide, cadmium selenide, or both) and the filtrate is passed through a return line 36 to a replenisher 38 where the cadmium chloride concentration in the recirculating aqueous solution is enriched. At this point, the filtrate is also de-acidified and prepared for return to the reaction chamber 16.

Because the reaction product is insoluble, the supernatant liquid in the chamber 16 can be siphoned off by the branch line 40 (FIG. 2) which extends into the chamber 16 and taps off the upper layer of fluid which contains essentially unreacted cadmium chloride. The material so tapped off through the line 40 is immediately returned through line 20 to the reaction chamber 16 via spray nozzle 24.

To make the process proceed continuously, it is necessary only to adjust the rate of incoming gas to the rate of circulation of the salt and the salt replenishing is then balanced with the rate of formation of the insoluble reaction product.

I am aware that selenide salts of zinc and cadmium can generally be prepared under the same or similar reaction conditions, and it is to be expected that the hereinabove described process for specific preparations of cadmium selenide will be equally suitable for a preparation of zinc selenide, sulfide or the like.

As described, the reactants are in a very finely divided state at the time of their reaction, viz., the hydrogen sulfide and/or selenide is in gaseous form and the cadmium chloride is dissolved in a finely dispersed liquid phase. This insures a high surface/volume ratio and greatly improves the opportunity for reaction without reaching saturation conditions. The continuous recycling of materials also makes maximum utilization of materials and reduces wastage to a minimum.

The process described has been successful in producing, continuously, a reaction product of a high degree of purity, this being possible in part by the high degree of purity of the gaseous reactant which is much more susceptible to purification than is the sulfur and/or selenium in its uncombined forms.

A further advantage of my process is that the activator and/or the coactivator elements can be, if desired, included directly into the system during the manufacture of the selenides and/or sulfides. This has the advantage of eliminating an extra operation in the production of phosphors or photoconductors, namely, that in which the "impurities" are added to the raw host material. The activator and/or coactivator is added to the solution in the form of soluble salts such as copper chloride, indium chloride, etc.

While the principles of the invention have been described in connection with specific apparatus, it is to be clearly understood that this description is made only by way of example and not as a limitation to the scope of the invention.

What is claimed is:

1. A continuous process for producing in a reaction vessel having solely one gas conduit, metal sulfide and metal selenide materials of sufficient purity for phosphor and semiconductor use comprising the steps of feeding gaseous material through the sole gas conduit into the vessel at a rate equal to that at which the gaseous material is consumed in the reaction hereinbelow mentioned, said gaseous material being selected from the class composed of hydrogen selenide and hydrogen sulfide, injecting at the top of said reaction vessel a finely divided aqueous solution of salt selected from the class composed of cadmium chloride and zinc chloride, whereby said finely divided solution in gravitating through the gaseous material presents a high surface-to-volume ratio which insures reaction of the gas and salt without saturation of the solution, continuously withdrawing liquid and solid material from the base of said reaction vessel thereby maintaining a predetermined liquid level in said reaction vessel, filtering out said solid material and collecting said solid material as product, recharging the filtrate with said salt and respraying said recharged solution into said reaction vessel.

2. A process as in claim 1 wherein said recycling step is further comprised of removing said liquid material from said reaction vessel, recharging the liquid material with said salt and returning the recharged salt solution to said reaction vessel.

References Cited in the file of this patent
UNITED STATES PATENTS

| | | |
|---|---|---|
| 2,020,325 | Myhren et al. | Nov. 12, 1935 |
| 2,130,382 | Copeland et al. | Sept. 30, 1938 |
| 2,357,130 | Pike | Aug. 29, 1944 |